(12) United States Patent
Choi et al.

(10) Patent No.: US 12,304,454 B2
(45) Date of Patent: May 20, 2025

(54) VEHICLE AND METHOD OF CONTROLLING VEHICLE

(71) Applicants: HYUNDAI MOTOR COMPANY, Seoul (KR); KIA CORPORATION, Seoul (KR)

(72) Inventors: Sunho Choi, Hwaseong-si (KR); Changseob Lim, Ansan-si (KR); Hyunwook Kim, Seoul (KR); Sang Jae Han, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 364 days.

(21) Appl. No.: 18/077,504

(22) Filed: Dec. 8, 2022

(65) Prior Publication Data

US 2023/0373459 A1    Nov. 23, 2023

(30) Foreign Application Priority Data

May 20, 2022    (KR) .................. 10-2022-0062004

(51) Int. Cl.
*B60Q 1/00*    (2006.01)
*B60L 58/12*    (2019.01)
*B60W 10/26*    (2006.01)
*B60W 20/10*    (2016.01)

(52) U.S. Cl.
CPC ............ *B60W 20/10* (2013.01); *B60L 58/12* (2019.02); *B60W 10/26* (2013.01); *B60W 2510/244* (2013.01)

(58) Field of Classification Search
CPC ................ B60W 20/10; B60W 10/26; B60W 2510/244; B60L 58/12; B60L 1/00; B60L 58/13; B60L 58/20; Y02T 10/70; B60R 16/03
USPC ......................................................... 340/455
See application file for complete search history.

(56) References Cited

U.S. PATENT DOCUMENTS

| 2014/0062352 | A1* | 3/2014 | Wang .................. H02P 5/68 318/139 |
| 2016/0375782 | A1* | 12/2016 | Liu .................. B60L 58/12 320/109 |

* cited by examiner

*Primary Examiner* — Tai T Nguyen
(74) *Attorney, Agent, or Firm* — Morgan, Lewis & Bockius LLP

(57) ABSTRACT

A vehicle configured to relay communication between a load using power while the vehicle is parked and a battery includes a first controller configured to control an operation of a first load operated while the vehicle is parked and a power management controller configured to identify at least one first battery configured to supply power to the first controller based on information on the vehicle upon receiving a power request message from the first controller and transmit a power use prohibition message or a power use permission message to the first controller based on a charged amount of the at least one first battery and a power demand amount of the first controller.

20 Claims, 7 Drawing Sheets

VEHICLE AND METHOD OF CONTROLLING VEHICLE

CROSS-REFERENCE TO RELATED APPLICATION

This application claims the benefit of Korean Patent Application No. 10-2022-0062004, filed on May 20, 2022 in the Korean Intellectual Property Office, the disclosure of which is incorporated herein by reference.

BACKGROUND

1. Technical Field

Embodiments of the present disclosure relate to a vehicle and a method of controlling the vehicle, and more specifically, to a vehicle, which is capable of efficiently supplying power to a load operating while the vehicle is parked regardless of the type of the vehicle, and a method of controlling the vehicle.

2. Description of the Related Art

In general, a vehicle refers to a movement or transportation means which travels on a road or a lane using fossil fuels, electricity, or the like as a power source.

Vehicles using fossil fuels may emit fine dust, steam, carbon dioxide, carbon monoxide, hydrocarbon, nitrogen, nitrogen oxide, and/or sulfur oxide due to the combustion of the fossil fuels. The steam and carbon dioxide are known as causes of global warming, and the fine dust, the carbon monoxide, the hydrocarbon, the nitrogen oxide, and/or the sulfur oxide are known as air pollutants which may harm humans.

Therefore, vehicles using eco-friendly energy replacing fossil fuels have recently been developed. For example, hybrid electric vehicles (HEVs) using both fossil fuels and electricity, electric vehicles (EVs) using only electricity, and the like are has been developed.

Meanwhile, with the development of technology, loads using power while a vehicle is parked are increasing.

As the types of vehicles are diversified and loads using power while a vehicle is parked increase, there is a need to simplify a logic for supplying power to the loads using power while the vehicle is parked.

SUMMARY

Therefore, it is an aspect of the present disclosure to provide a vehicle which relays communication between a load using power while the vehicle is parked and a battery, and a method of controlling the vehicle.

Additional aspects of the disclosure will be set forth in part in the description which follows and, in part, will be obvious from the description, or may be learned by practice of the disclosure.

In accordance with one aspect of the present disclosure, a vehicle may include a first controller configured to control an operation of a first load operated while the vehicle is parked and a power management controller configured to identify at least one first battery configured to supply power to the first controller based on information on the vehicle upon receiving a power request message from the first controller and transmit a power use prohibition message or a power use permission message to the first controller based on a charged amount of the at least one first battery and a power demand amount of the first controller.

In addition, the vehicle may further include a second controller configured to control an operation of a second load operated while the vehicle is parked, wherein the power management controller may identify at least one second battery configured to supply power to the second controller based on the information on the vehicle upon receiving a power request message from the second controller and transmit the power use prohibition message or the power use permission message to the second controller based on a charged amount of the at least one second battery and a power demand amount of the second controller.

In addition, the first controller may operate the first load in response to receiving the power use permission message from the power management controller and maintain the first load in a state of not being operated in response to receiving the power use prohibition message from the power management controller.

In addition, the information on the vehicle may include at least one of a type of the vehicle classified based on an energy source and a type of the at least one battery applied to the vehicle.

In addition, when the vehicle is an internal combustion engine vehicle, the power management controller may acquire information on the charged amount of the at least one first battery from at least one battery sensor configured to detect the charged amount of the at least one first battery.

In addition, when the vehicle is an electric vehicle, the power management controller may request information on the charged amount of the at least one first battery from a battery management controller.

In addition, the at least one first battery may include a main battery, and the power management controller may transmit the power use prohibition message to the first controller based on a charged amount of the main battery smaller than a threshold determined based on the power demand amount of the first controller and transmit the power use permission message to the first controller based on the charged amount of the main battery greater than or equal to the threshold.

In addition, the at least one first battery may include a main battery and an auxiliary battery, and the power management controller may transmit the power use prohibition message to the first controller based on a value obtained by summing a charged amount of the main battery and a charged amount of the auxiliary battery smaller than a threshold determined based on the power demand amount of the first controller and transmit the power use permission message to the first controller based on the value obtained by summing the charged amount of the main battery and the charged amount of the auxiliary battery greater than or equal to the threshold.

In addition, the power management controller may transmit the power use permission message to the first controller and then transmit the power use prohibition message to the first controller in response to stopping a power assistance operation of the auxiliary battery.

In addition, the first controller may transmit a power use completion message to the power management controller when the operation of the first load is ended.

In addition, the at least one first battery may include a high-voltage battery and a low-voltage battery, and the power management controller may request step-down of a voltage of the high-voltage battery from a battery management controller, request information on a charged amount of the low-voltage battery from the battery management controller, and transmit the power use prohibition message or the power use permission message to the first controller based on the information on the charged amount of the low-voltage battery upon receiving a reject message for the step-down of the voltage of the high-voltage battery from the battery management controller.

In accordance with another aspect of the present disclosure, a method of controlling a vehicle may include transmitting, by a first controller configured to control an operation of a first load operated while the vehicle is parked, a power request message to a power management controller, identifying, by the power management controller, at least one first battery configured to supply power to the first controller based on information on the vehicle upon receiving the power request message from the first controller and transmitting, by the power management controller, a power use prohibition message or a power use permission message to the first controller based on a charged amount of the at least one first battery and a power demand amount of the first controller.

In addition, the method of controlling the vehicle may further include transmitting, by a second controller configured to control an operation of a second load operated while the vehicle is parked, the power request message to the power management controller, identifying, by the power management controller, at least one second battery configured to supply power to the second controller based on the information on the vehicle upon receiving the power request message from the second controller, and transmitting, by the power management controller, the power use prohibition message or the power use permission message to the second controller based on a charged amount of the at least one second battery and a power demand amount of the second controller.

In addition, the method of controlling the vehicle may further include operating, by the first controller, the first load in response to receiving the power use permission message from the power management controller and maintaining, by the first controller, the first load in a state of not being operated in response to receiving the power use prohibition message from the power management controller.

In addition, the information on the vehicle may include at least one of a type of the vehicle classified based on an energy source and a type of the at least one battery applied to the vehicle.

In addition, when the vehicle is an internal combustion engine vehicle, the method of controlling the vehicle may further include acquiring, by the power management controller, information on the charged amount of the at least one first battery from at least one battery sensor configured to detect the charged amount of the at least one first battery.

In addition, when the vehicle is an electric vehicle, the method of controlling the vehicle may further include requesting, by the power management controller, information on the charged amount of the at least one first battery from a battery management controller.

In addition, the at least one first battery may include a main battery, and the transmitting of, by the power management controller, the power use prohibition message or the power use permission message to the first controller may include transmitting the power use prohibition message to the first controller based on a charged amount of the main battery smaller than a threshold determined based on a power demand amount of the first controller and transmitting the power use permission message to the first controller based on the charged amount of the main battery greater than or equal to the threshold.

In addition, the at least one first battery may include a main battery and an auxiliary battery, and the transmitting of, by the power management controller, the power use prohibition message or the power use permission message to the first controller may include transmitting the power use prohibition message to the first controller based on a value obtained by summing a charged amount of the main battery and a charged amount of the auxiliary battery smaller than a threshold determined based on the power demand amount of the first controller and transmitting the power use permission message based on the value obtained by summing the charged amount of the main battery and the charged amount of the auxiliary battery greater than or equal to the threshold.

In addition, the method of controlling the vehicle may further include transmitting, by the power management controller, the power use permission message to the first controller and then transmitting the power use prohibition message to the first controller in response to stopping a power assistance operation of the auxiliary battery.

In addition, the method of controlling the vehicle may further include transmitting, by the first controller, a power use completion message to the power management controller when the operation of the first load is ended.

In addition, the at least one first battery may include a high-voltage battery and a low-voltage battery, and the transmitting of the power use prohibition message or the power use permission message to the first controller may include requesting step-down of a voltage of the high-voltage battery from a battery management controller, requesting information on a charged amount of the low-voltage battery from the battery management controller, and transmitting the power use prohibition message or the power use permission message to the first controller based on the information on the charged amount of the low-voltage battery upon receiving a reject message for the step-down of the voltage of the high-voltage battery from the battery management controller.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
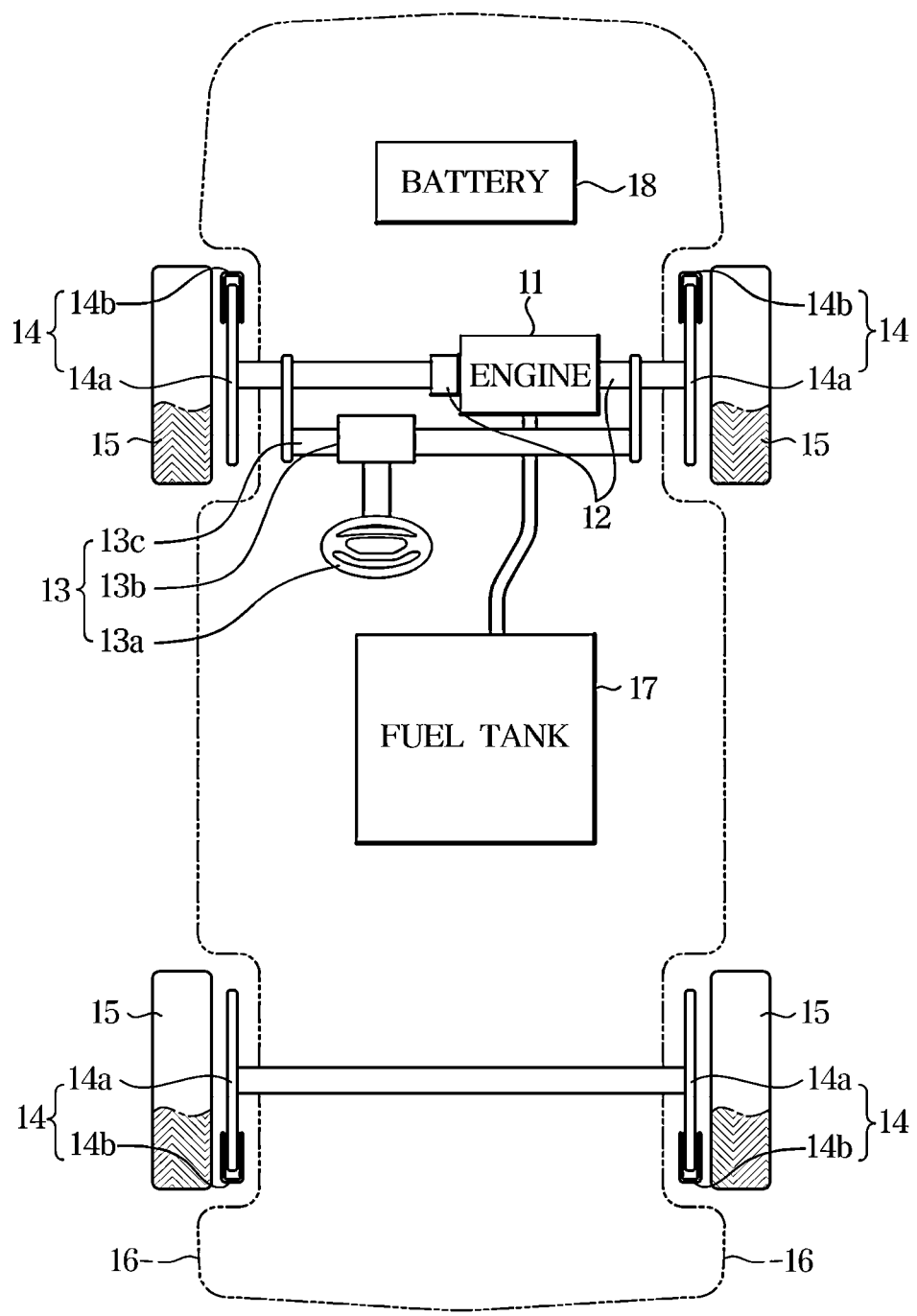
FIG. 1 shows a configuration of an internal combustion engine vehicle according to one embodiment.

Advantage and features of the disclosure and an apparatus and method for achieving them will be made clear from embodiments described below with reference to the accompanying drawings. However, the disclosure is not limited to the embodiments disclosed below but will be implemented in various different forms, and only the disclosed embodiments are provided so that the disclosure will be thorough and complete and will fully convey the scope of the disclosure to those skilled in the art to which the disclosure pertains, and the disclosed invention is defined by the scope of the claims and their equivalents.

Terms used in the disclosed specification will be briefly described, and the embodiments of the disclosure will be described in detail.

The terms used in the disclosure have been selected as currently widely used general terms as possible while considering the functions in the disclosure, but this may vary depending on the intention of those skilled in the art, cases (embodiments), the emergence of new technology, or the like. In addition, in a specific case, there is a term arbitrarily selected by the applicant, and in this case, the meaning will be given in detail in the description of the corresponding disclosure. Therefore, the terms used in the disclosure should be defined based on the meaning of the term and the contents throughout the disclosure, rather than the name of a simple term.

Throughout the specification, when a certain portion is described as "including" a certain component, it means that other components may be further included rather than precluding other components unless otherwise stated. In addition, the term "unit" used in the specification refers to a hardware component such as software, a field programmable gate array (FPGA), or application specific integrated circuit (ASIC), and the "unit" performs certain roles. However, the "unit" is not meant to be limited to software or hardware. The "unit" may also be configured to reside on an addressable storage medium and may also be configured to execute one or more processors. Therefore, as one example, the "unit" refers to components such as software components, object-oriented software components, class components, and task components, processes, functions, attributes, procedures, subroutines, segments of program code, drivers, firmware, microcodes, circuits, data, databases, data structures, tables, arrays, and variables. The functionality provided within components and "units" may be coupled to be a smaller number of components and "units" or further divided into additional components and "units."

Hereinafter, embodiments of a vehicle and a method of controlling the vehicle will be described in detail with reference to the accompanying drawings so as to be easily carried out by those skilled in the art to which the disclosure pertains. In addition, in order to clearly describe the embodiments disclosed in the drawings, portions not related to the description will be omitted. In addition, in the drawings, the same reference numerals denote the same components, and overlapping descriptions thereof will be omitted.

A vehicle is a mechanical/electrical device configured to transport people and/or goods using a rotational force of an engine and/or a rotational force of a motor.

A vehicle using the engine (hereinafter referred to as an "internal combustion engine vehicle") may explosively combust fossil fuels such as gasoline, diesel, and gas, convert a translational movement force generated while the fossil fuels are combusted into a rotational movement force, and be moved using the converted rotational force. The internal combustion engine vehicle may receive the fossil fuels (e.g., gasoline and diesel) from the outside.

The internal combustion engine vehicle may include at least one battery for operating various loads provided in the vehicle. For example, the at least one battery may be a lead acid battery.

A vehicle using a motor (hereinafter referred to as an "electric vehicle") is called an electric vehicle (EV), and may convert electric energy stored in a battery into rotational energy and be moved using the converted rotational energy. The electric vehicle may receive power from the outside.

There are also a vehicle using both an engine and a motor (hereinafter referred to as a "hybrid electric vehicle"). The vehicle is called a hybrid electric vehicle (HEV) and may be moved using the engine as well as being moved using the motor. The HEV may be classified into a general HEV which receives only the fossil fuels from the outside and generates electric energy using the engine and the motor (generator) and a plug-in hybrid electric vehicle (PHEV) which may receive both the fossil fuels and the electric energy from the outside.

Each of the electric vehicle and the HEV generally includes a high-voltage battery configured to supply electric energy to a driving motor and a low-voltage battery configured to supply electric energy to electric components of the vehicle. For example, the high-voltage battery configured to supply electrical energy to the driving motor may have an output voltage of about several hundred volts (V) (e.g., in the range of 300 V to 400 V), and the low-voltage battery configured to supply electrical energy to the electric components may have an output voltage of about several tens volts (e.g., 12 V).

The electric vehicle and the hybrid vehicle may charge high-voltage batteries while traveling. The driving motor may not only convert electrical energy into kinetic energy (rotational force) but also convert the kinetic energy (rotational force) into the electrical energy. In other words, the driving motor may function as a motor when electric energy is supplied from the outside and function as a generator to which kinetic energy is supplied from the outside. When a vehicle travels on a downhill road or a speed of the vehicle is decreased by an operation of the driving motor (regenerative braking), the driving motor may generate power and charge a high-voltage battery using power generated by the driving motor (charging by the regenerative braking).

In addition, the electric vehicle and the HEV (particularly, the PHEV) may charge a high-voltage battery from an external power source (e.g., a direct current (DC) power source or an alternating current (AC) power source) while the vehicle is parked. For example, a high-voltage battery of a vehicle may be charged using a commercial DC power source at a charging station, and the high-voltage battery of the vehicle may be charged using an available AC power source at home.

FIG. 1 shows a configuration of an internal combustion engine vehicle according to one embodiment.

Referring to FIG. 1, according to various embodiments, a vehicle 1 may be an internal combustion engine vehicle 10 using the fossil fuels.

The internal combustion engine vehicle 10 may include an engine 11 configured to generate power, a power transmission device 12 configured to transmit the power, a steering device 13 configured to control a traveling direction of the vehicle 10, a braking device 14 configured to stop the vehicle 10, a wheel 15 configured to move the vehicle 10, a fuel tank 17 configured to supply the fossil fuels to the engine 11, and at least one battery 18 configured to supply the power to a plurality of loads provided in the vehicle 10. In addition, a chassis may further include a frame 16 configured to fix the engine 11, the power transmission device 12, the steering device 13, the braking device 14, the wheel 15, the fuel tank 17, and the battery 18.

The internal combustion engine vehicle may be moved using the fossil fuels as an energy source.

Specifically, the engine 11 may convert thermal energy generated by combusting the fossil fuels supplied from the fuel tank 17 into mechanical energy and provide a rotational force to the wheel 15 through the power transmission device 12.

The power transmission device 12 may include a shift lever, a differential device, a drive shaft, and the like configured to transmit the rotational force generated by the engine 11 to the wheel.

According to various embodiments, the at least one battery 18 may include a main battery which is a main power source configured to mainly supply power to the plurality of loads while the vehicle is parked and an auxiliary battery which is an auxiliary power source configured to supply power to the plurality of loads while the vehicle is parked.

The at least one battery 18 may correspond to a low-voltage battery 29 of an electric vehicle 20 and/or a low-voltage battery 39 of the HEV 30, which will be described below.

In the internal combustion engine vehicle 10, the battery 18 supplies power operating an ignition device configured to start the vehicle 10. Therefore, when the battery 18 is discharged, there may occur a problem that the vehicle 10 does not start.

Figure 2:
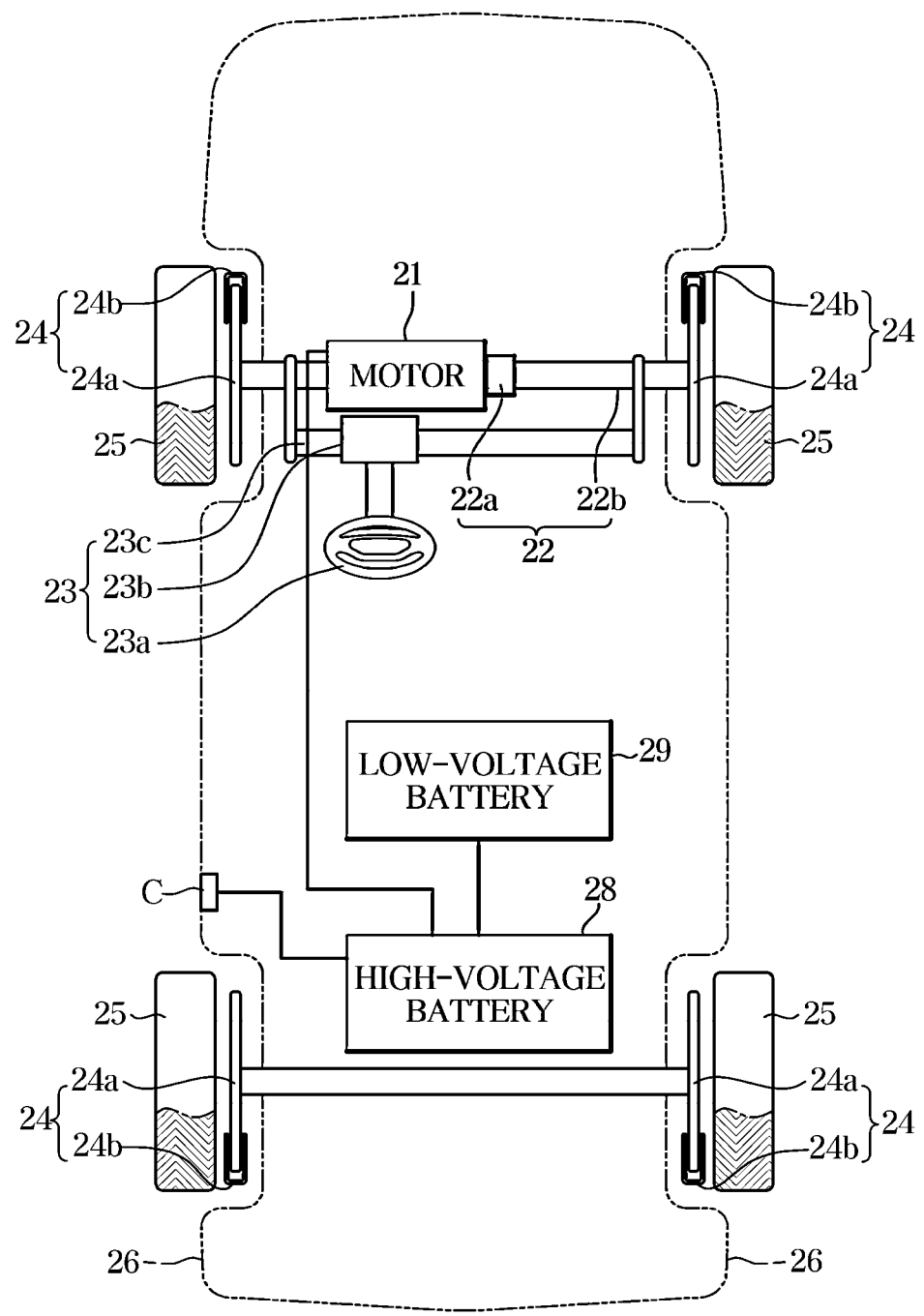
FIG. 2 shows a configuration of an electric vehicle according to one embodiment.

FIG. 2 shows a configuration of an electric vehicle according to one embodiment.

Referring to FIG. 2, according to various embodiments, a vehicle 1 may be the electric vehicle 20 using the electric energy.

The electric vehicle 20 may include a motor 21 configured to generate power, a power transmission device 22 configured to transmit the power, a steering device 23 configured to control a traveling direction of the vehicle 20, a braking device 24 configured to stop the vehicle 20, a wheel 25 configured to move the vehicle 20, a high-voltage battery 28 configured to supply the power to the motor 21, and at least one low-voltage battery 29 configured to supply the power to a plurality of loads provided in the vehicle 20. In addition, a chassis may further include a frame 26 configured to fix the motor 21, the power transmission device 22, the steering device 23, the braking device 24, the wheel 25, the high-voltage battery 28, and the low-voltage battery 29.

Compared to the vehicle 10 shown in FIG. 1, the engine 11, the fuel tank 17, and the like may be omitted when compared to the vehicle 10, and the vehicle 20 may include only the motor 21, the high-voltage battery 28, and a charging circuit C.

The power transmission device 22 may transmit the rotational force generated by the motor 21 to the wheel 25 and include a transmission 22a, a shift lever, a differential device, a drive shaft 22b, and the like.

According to various embodiments, the high-voltage battery 28 may also provide the power to the plurality of loads. For example, the vehicle 20 may further include a transformer circuit and/or a converter configured to supply the power of the high-voltage battery 28 to the plurality of loads. The transformer circuit and/or the converter may decrease the voltage of the high-voltage battery 28 and supply the decreased voltage to the plurality of loads.

According to various embodiments, the at least one low-voltage battery 29 may include a main battery which is a main power source configured to mainly supply the power to the plurality of loads while the vehicle is parked and an auxiliary battery which is an auxiliary power source configured to supply the power to the plurality of loads while the vehicle is parked.

Since the power of the high-voltage battery 28 configured to drive the motor may also be supplied to the plurality of loads, the high-voltage battery 28 may also be defined as the auxiliary battery in terms of an energy source configured to supply the power to the plurality of loads while the vehicle is parked.

Figure 3:
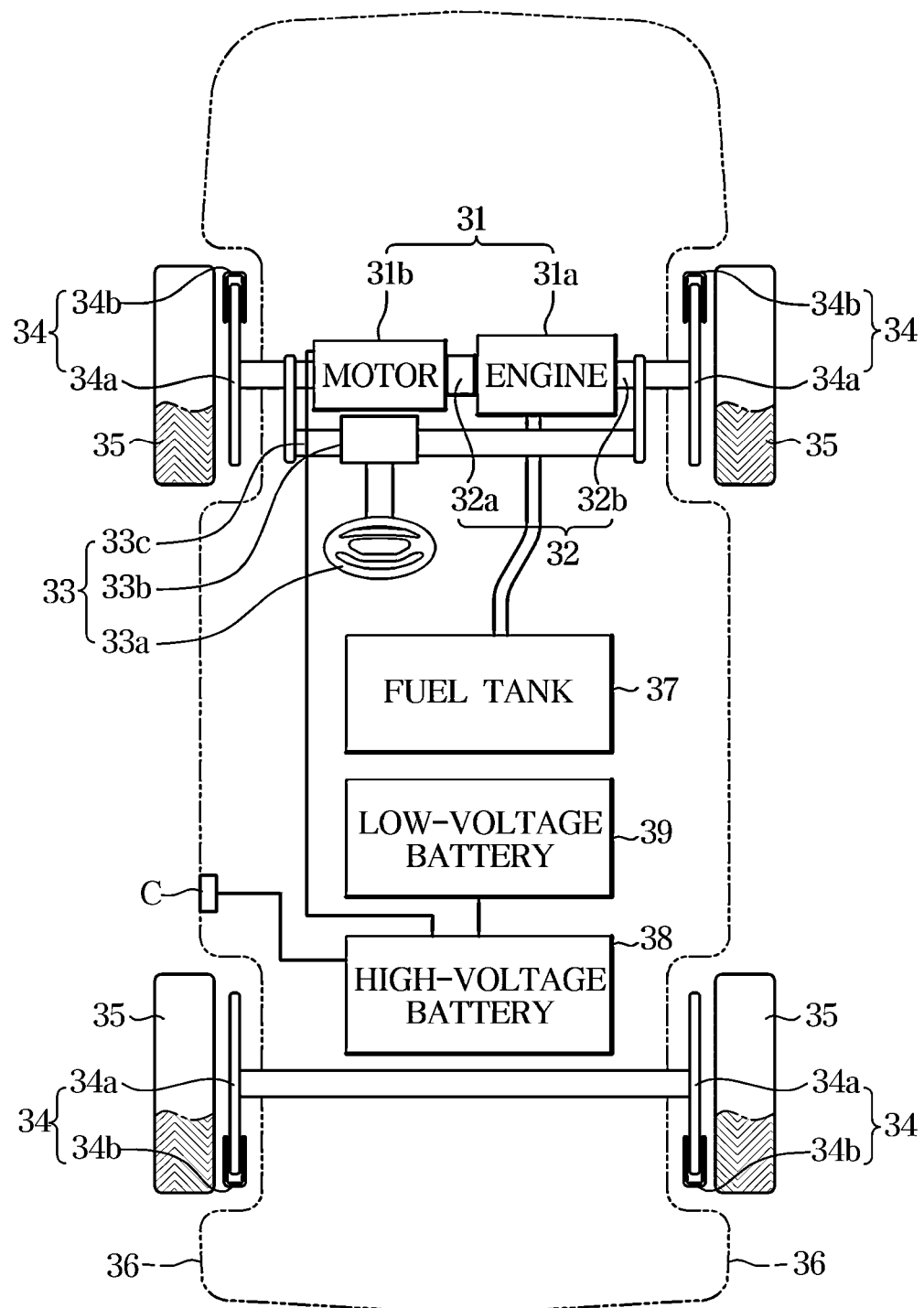
FIG. 3 shows a configuration of a hybrid electric vehicle according to one embodiment.

FIG. 3 shows a configuration of a HEV according to one embodiment.

Referring to FIG. 3, according to various embodiments, a vehicle 1 may be a HEV 30 including both a motor 31b and an engine 31a.

The HEV 30 may include a power generation device 31 configured to generate power, a power transmission device 32 configured to transmit the power, a steering device 33 configured to control a traveling direction of the vehicle 30, a braking device 34 configured to stop the vehicle 30, a wheel 35 configured to move the vehicle 30, and a low-voltage battery 39 configured to supply the power to a plurality of loads. In addition, the chassis may further include a frame 36 configured to fix the power generation device 31, the power transmission device 32, the steering device 33, the braking device 34, the wheel 35, and the low-voltage battery 39.

The power generation device 31 may generate a rotational force for traveling the vehicle 30 and include an engine 31a, a fuel supply device 37, an exhaust device, a motor 31b, a high-voltage battery 38, a charging circuit C, and the like.

The power transmission device 32 may transmit the rotational force generated by the power generation device 31 to the wheel 35 and include a transmission 32a, a shift lever, a differential device, a drive shaft 32b, and the like.

According to various embodiments, the high-voltage battery 38 may also provide the power to the plurality of loads. For example, the vehicle 30 may further include a transformer circuit and/or a converter configured to supply the power of the high-voltage battery 38 to the plurality of loads. The transformer circuit and/or the converter may step down a voltage of the high-voltage battery 38 and supply the stepped-down voltage to the plurality of loads.

According to various embodiments, the at least one low-voltage battery 39 may include a main battery which is a main power source configured to mainly supply the power to the plurality of loads while the vehicle is parked and an auxiliary battery which is an auxiliary power source configured to supply the power to the plurality of loads while the vehicle is parked.

In the present disclosure, the high-voltage batteries 28 and 38 may output higher voltages (e.g., voltages of about 300 V to 400 V) than the low-voltage batteries 18, 29, and 39.

The low-voltage batteries 18, 29, and 39 are configured to supply the power to the electric components of the vehicle 1 according to standardized standards and may output lower voltages (e.g., voltages of about 12 V to 14 V) than the high-voltage batteries 28 and 38.

In the electric vehicle 20 and the HEV 30, a step-down converter may decrease the voltages of the powers output from the high-voltage batteries 28 and 38 and supply the decreased voltages to the low-voltage batteries 29 and 39.

In FIGS. 1 to 3, the steering devices 13, 23, and 33 may control the traveling directions of the vehicles 10, 20, and 30 and include steering wheels 13a, 23a, and 33a, steering gears 13b, 23b, and 33b, steering links 13c, 23c, and 33c, and the like.

The braking devices 14, 24, and 34 may stop the rotation of the wheels 15, 25, and 35 and include brake pedals, master cylinders, brake disks 14a, 24a, and 34a, brake pads 14b, 24b, and 34b, and the like.

The wheels 15, 25, and 35 may receive the rotational forces from engine 11, motor 21, and power generation devices 31 through the power transmission devices 12, 22, and 32 and move the vehicles 10, 20, and 30. The wheels 15, 25, and 35 may include front wheels provided at the front of the vehicles 10, 20, and 30 and rear wheels provided at the rear of the vehicles 10, 20, and 30.

The type of the vehicle 1 classified based on the energy source have been described above.

As described above, the vehicle 1 may be classified into the internal combustion engine vehicle 10, the electric vehicle 20, and/or the HEV 30 based on the energy source, but the type of the vehicle 1 is not limited thereto.

In addition, as described above, the types of the batteries applied to the internal combustion engine vehicle 10, the electric vehicle 20, and/or the HEV 30 may be different from one another. However, the types of the batteries applied to the internal combustion engine vehicle 10, the electric vehicle 20, and/or the HEV 30 are not limited to the above-described examples.

Meanwhile, since the type of the battery applied to the vehicle is different from each other depending on the type of the vehicle, according to the related art, each of the plurality of controllers configured to control the plurality of loads undergoes a slightly complicated procedure when requesting power from the power source of the vehicle while the vehicle is parked.

For example, each of the plurality of controllers according to the related art needs to request information on the vehicle from a vehicle management controller when the load requires power.

In this case, the information on the vehicle may include information on the type of the vehicle classified according to the energy source and/or the battery applied to the vehicle.

Each of the plurality of controllers determines a target (e.g., a low-voltage battery). Each of the plurality of controllers, which needs to request power based on the information on the vehicle, requests the power from the determined target. At this time, when each of the plurality of controllers simultaneously requests the power from the same target, there is a risk of the battery being discharged.

In addition, each of the plurality of controllers needs to perform data processing for identifying the target which needs to supply the power.

In addition, since each of the plurality of controllers needs to request information from the vehicle management controller to supply power to the load, receive the information on the vehicle from the vehicle management controller, request the power from the target which needs to supply the power, and receive a reply to whether a request for power may be received by the target which needs to supply the power, a large amount of communication messages needs to be transmitted through a vehicle communication network.

As will be described below, the vehicle 1 according to one embodiment can solve the problem of the related art described above by including a power management controller configured to relay communication between the plurality of controllers and at least one battery regardless of the type of the vehicle.

Figure 4:
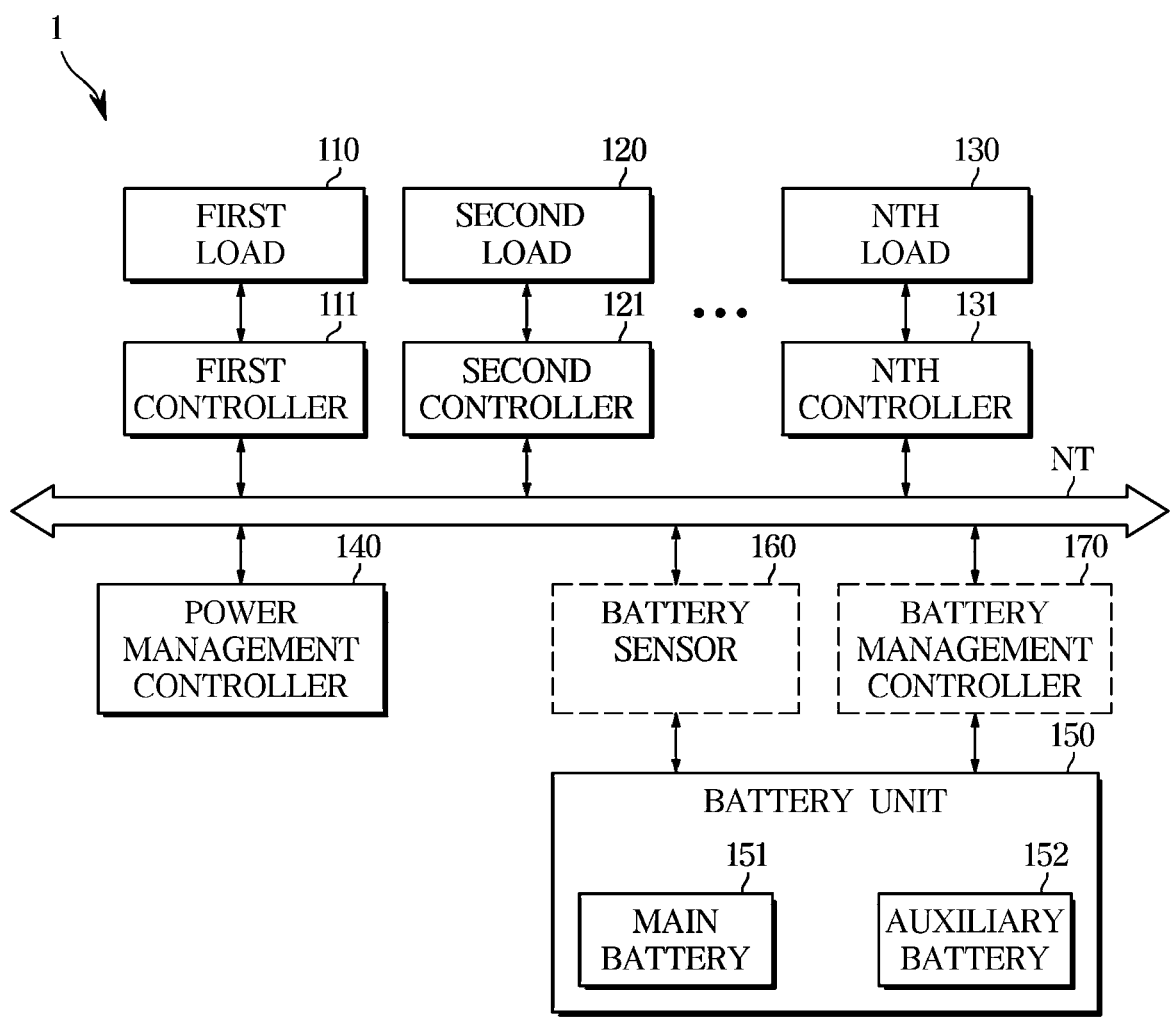
FIG. 4 is a block diagram showing a configuration of a vehicle according to one embodiment.

FIG. 4 is a block diagram showing a configuration of a vehicle according to one embodiment.

Referring to FIG. 4, a vehicle 1 according to one embodiment may include a plurality of loads (e.g., a first load 110, a second load 120, . . . , and an $n^{th}$ load 130), a plurality of controllers (e.g., a first controller 111, a second controller 121, . . . , and an $n^{th}$ controller 131) configured to control the plurality of loads 110, 120, and 130, a power management controller 140, and a battery unit 150 (n is a natural number).

The plurality of loads (e.g., the first load 110, the second load 120, . . . , and the $n^{th}$ load 130) may be operated while the vehicle 1 is parked.

The plurality of loads 110, 120, and 130 may be operated after receiving power from the battery unit 150 even in a state in which the vehicle 1 is turned off.

For example, the plurality of loads 110, 120, and 130 may include an audio device, a heating/ventilation/air conditioning (HVAC) device, a navigation device, a power seat, a seat heater, a seat blower, an after blower, a room lamp, various infotainment devices, and the like.

The plurality of controllers (e.g., the first controller 111, the second controller 121, . . . , and the $n^{th}$ controller 131) may control the operations of the plurality of loads 110, 120, and 130.

For example, assuming that the first load 110 is the after blower, the first controller 111 may operate the first load 110 when a preset condition is satisfied after the vehicle 1 is turned off. At this time, power is required for the first controller 111 to operate the first load 110.

As another example, assuming that the second load 120 is the navigation device, the second controller 121 may update software of the navigation device after the vehicle 1 is turned off. For example, the second controller 121 may update the software of the navigation device through an over-the-air (OTA) method.

In the present disclosure, updating the software applied to the load may also be construed as an example of a method of operating the load.

As described above, each of the plurality of controllers 111, 121, and 131 may operate the plurality of loads 110, 120, and 130 in a state in which the vehicle 1 is parked, that is, in a state in which the vehicle 1 is turned off.

Meanwhile, the vehicle 1 according to one embodiment may include the power management controller 140 configured to relay communication between the plurality of controllers 111, 121, and 131 and at least one battery 151 and 152 regardless of the type of the vehicle.

The plurality of controllers 111, 121, and 131 may transmit a power request message to the power management controller 140, and the power management controller 140 may transmit a power use prohibition message or a power use permission message to the plurality of controllers 111, 121, and 131 based on information on the battery unit 150.

The battery unit 150 may include different batteries depending on the type of the vehicle 1 and/or the type of the battery applied to the vehicle according to the type of the vehicle 1.

The battery unit 150 may include a main battery 151 configured to mainly supply power to the plurality of loads while the vehicle 1 is parked and an auxiliary battery 152 which is the other power source optionally provided separately from the main battery 151.

According to various embodiments, when the vehicle 1 corresponds to the internal combustion engine vehicle 10, the battery unit 150 may include one battery 18 serving as the main battery 151.

In addition, according to various embodiments, when a dual power source battery is applied to the internal combustion engine vehicle 10, the battery unit 150 may include a first battery 18 serving as the main battery 151 and a second battery 18 serving as the auxiliary battery 152.

According to various embodiments, when the vehicle 1 corresponds to the electric vehicle 20, the battery unit 150 may include one low-voltage battery 29 serving as the main battery 151.

In addition, according to various embodiments, when the dual power source battery is applied to the electric vehicle 20, the battery unit 150 may include the first low-voltage battery 29 serving as the main battery 151 and the second low-voltage battery 29 serving as the auxiliary battery 152.

In addition, according to various embodiments, when the transformer circuit and/or converter configured to step down the voltage of the high-voltage battery 28 is applied to the electric vehicle 20, the high-voltage battery 28 may also be operated as the auxiliary battery 152.

In addition, according to various embodiments, when the transformer circuit and/or converter configured to step down the voltage of the high-voltage battery 28 is applied to the electric vehicle 20, the high-voltage battery 28 may be operated as the main battery 151, and the low-voltage battery 29 may be operated as the auxiliary battery 152.

Likewise, when the vehicle 1 corresponds to the HEV 30, the battery unit 150 may include one low-voltage battery 39 serving as the main battery 151.

In addition, according to various embodiments, when the dual power source battery is applied to the HEV 30, the battery unit 150 may include the first low-voltage battery 39 serving as the main battery 151 and the second low-voltage battery 39 serving as the auxiliary battery 152.

In addition, according to various embodiments, when the transformer circuit and/or converter configured to step down the voltage of the high-voltage battery 38 is applied to the HEV 30, the high-voltage battery 38 may also be operated as the auxiliary battery 152.

In addition, according to various embodiments, when the transformer circuit and/or converter configured to step down the voltage of the high-voltage battery 38 is applied to the HEV 30, the high-voltage battery 38 may be operated as the main battery 151, and the low-voltage battery 39 may be operated as the auxiliary battery 152.

In other words, the battery unit 150 may include different types of batteries according to the type of the vehicle 1.

Similarly, depending on the type of the vehicle 1, the vehicle 1 may include a battery sensor 160 and/or a battery management controller 170.

According to various embodiments, when the vehicle 1 corresponds to the internal combustion engine vehicle 10, the vehicle 1 may include the battery sensor 160 configured to detect the charged amount of the battery 18. When the vehicle 1 corresponds to the internal combustion engine vehicle 10, the battery management controller 170 may be omitted.

In addition, according to various embodiments, when the dual power source battery is applied to the internal combustion engine vehicle 10, the battery sensor 160 may include a first battery sensor configured to detect the charged amount of the battery 18 and a second battery sensor configured to detect the charged amount of the second battery 18.

According to various embodiments, when the vehicle 1 corresponds to the electric vehicle 20 and/or the HEV 30, the vehicle 1 may include the battery management controller 170 configured to manage the at least one battery 28, 29, 38, and 39.

The battery management controller 170 may also be defined as a battery management system (BMS) and is a component configured to manage the at least one battery 28, 29, 38, and 39.

As described above, since the electric vehicle 20 and/or the HEV 30 includes the battery management controller 170 configured to manage the at least one battery 28, 29, 38, and 39 unlike the internal combustion engine vehicle 10, the battery management controller 170 communicates directly with other components.

The plurality of loads 110, 120, and 130, the power management controller 140, the battery sensor 160, and/or the battery management controller 170 may exchange messages with one another through a vehicle communication network NT.

For example, the vehicle communication network NT may refer to an Ethernet, a media oriented systems transport (MOST), a Flexray, a controller area network (CAN), a local interconnect network (LIN), and the like.

Components of the plurality of controllers 111, 121, and 131, the power management controller 140, and/or the battery management controller 170 may include a memory configured to store control programs for controlling the corresponding components and/or data and a processor configured to generate a control signal according to the control programs and data stored in the memory.

Figure 5:
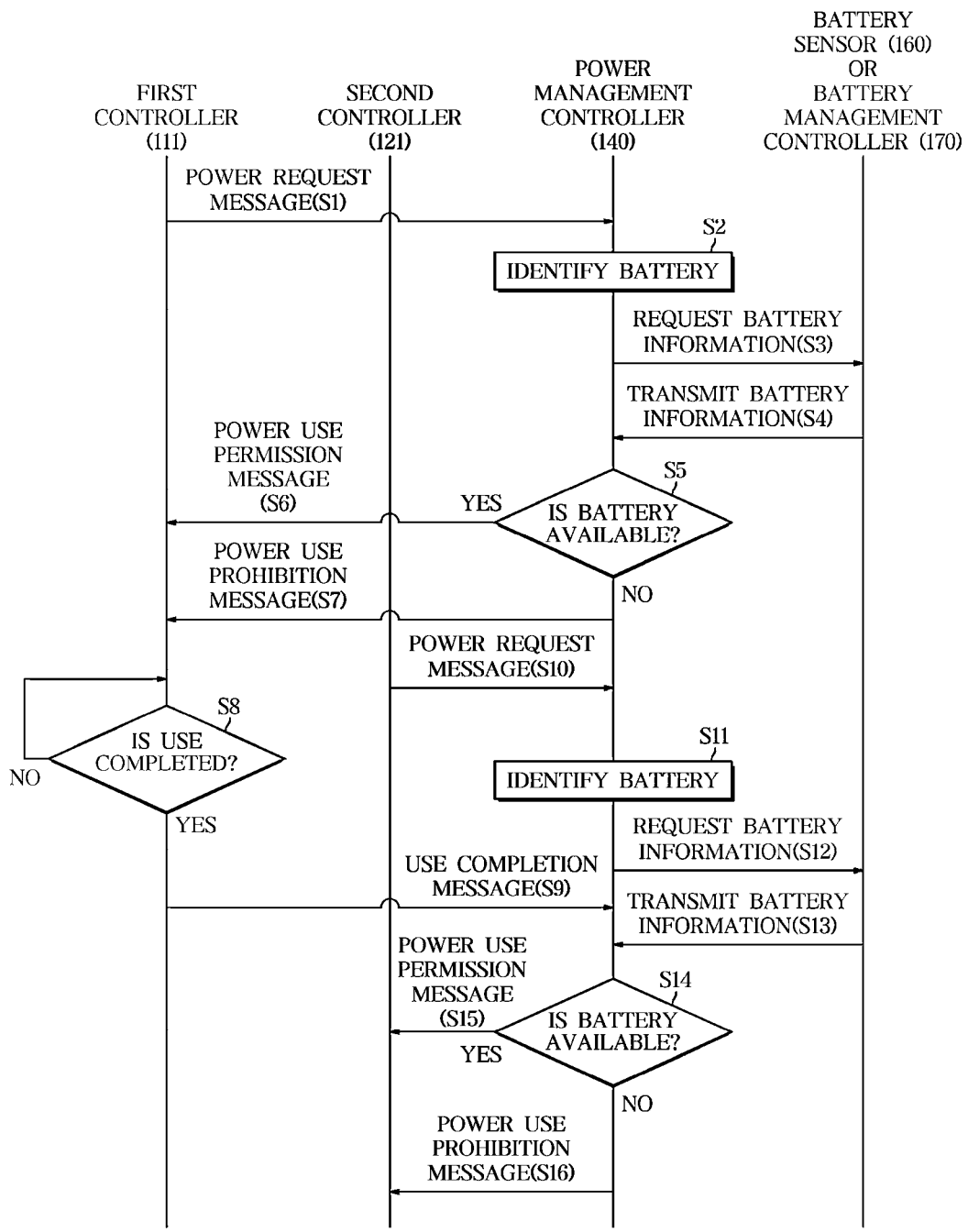
FIG. 5 is a flowchart showing an example of a method of controlling a vehicle when the vehicle includes only a main battery according to one embodiment.

FIG. 5 is a flowchart showing an example of a method of controlling a vehicle when the vehicle includes only a main battery according to one embodiment.

FIG. 5 shows an example in which the first controller 111 and the second controller 121 transmit the power request message to the power management controller 140, but it goes without saying that the descriptions of the first controller 111 and the second controller 121 may be applied to the $n^{th}$ controller 131 in the same manner.

Referring to FIG. 5, at least one of the plurality of controllers 111, 121, and 131 may transmit the power request message to the power management controller 140 while the vehicle 1 is parked (and/or in a state in which the vehicle 1 is turned off).

For example, the first controller 111 may transmit the power request message to the power management controller 140 based on satisfying an operating condition of the first load 110 (S1).

According to various embodiments, when the first load 110 is the after blower, the first controller 111 may transmit the power request message to the power management controller 140 based on satisfying an operating condition of the after blower.

According to various embodiments, when the first load 110 is the infotainment system, the first controller 111 may transmit the power request message to the power management controller 140 based on satisfying a software update condition of the infotainment system.

According to various embodiments, the power request message may include information on the type of the first controller 111 and information on the power demand amount of the first controller 111.

The power demand amount of the first controller 111 may refer to a total amount of power required for the first controller 111 to operate the first load 110.

The power management controller 140 may identify at least one battery (hereinafter referred to as the "first battery") configured to supply power to the first controller 111 upon receiving the power request message from the first controller 111 (S2).

According to various embodiments, the power management controller 140 may request the information on the vehicle 1 from the vehicle management controller and identify at least one first battery configured to supply power to the first controller 111 based on the information on the vehicle 1 received from the vehicle management controller.

In this case, the information on the vehicle 1 may include at least one of the type of the vehicle classified based on the energy source and the type of at least one battery applied to the vehicle.

In addition, the vehicle management controller may refer to a controller storing the information on the vehicle 1.

More specifically, when the vehicle 1 corresponds to the internal combustion engine vehicle 10 and the auxiliary battery 152 (e.g., the dual power source battery) is not applied or not present, the power management controller 140 may identify the battery 18 in FIG. 1 as the first battery.

In addition, when the vehicle 1 corresponds to the electric vehicle 20 and the auxiliary battery 152 is not applied to or not present in the vehicle, the power management controller 140 may identify the low-voltage battery 29 in FIG. 2 as the first battery.

In addition, when the vehicle 1 corresponds to the HEV 30 and the auxiliary battery 152 is not applied to or not present in the vehicle, the power management controller 140 may identify the low-voltage battery 39 in FIG. 3 as the first battery.

As described above, the battery identification operation performed by the first controller according to the related art may be performed by the power management controller 140 according to the present disclosure instead of the first controller 111.

The power management controller 140 may request information on the charged amount of the first battery from the battery sensor 160 or the battery management controller 170 (S3).

According to various embodiments, when the vehicle 1 corresponds to the internal combustion engine vehicle 10 and the auxiliary battery 152 (e.g., the dual power source battery) is not applied to or present in the vehicle 1, the power management controller 140 may request the information on the charged amount of the battery 18 from the battery sensor 160 configured to detect the charged amount of the battery 18 in FIG. 1 through the vehicle communication network NT.

According to various embodiments, when the vehicle 1 corresponds to the electric vehicle 20 and the auxiliary battery 152 (e.g., the dual power source battery) is not applied to or present in the vehicle 1, the power management controller 140 may request information on the charged amount of the battery 29 from the battery management controller 170 configured to manage the low-voltage battery 29 in FIG. 2 through the vehicle communication network NT.

According to various embodiments, when the vehicle 1 corresponds to the HEV 30 and the auxiliary battery 152 (e.g., the dual power source battery) is not applied to or present in the vehicle 1, the power management controller 140 may request information on the charged amount of the battery 39 from the battery management controller 170 configured to manage the low-voltage battery 39 in FIG. 3 through the vehicle communication network NT.

The battery sensor 160 or the battery management controller 170 may transmit the information on the charged amount of the first battery 151 (18, 29, or 39) to the power management controller 140 in response to receiving the request for the information on the charged amounts of the first batteries 151 from the power management controller 140 (S4).

The power management controller 140 may determine whether the first battery 151 is available based on the information on the charged amount of the first battery 151 and the power demand amount of the first controller 111 (S5).

According to various embodiments, the power management controller 140 may compare the charged amount of the first battery 151 with the power demand amount of the first controller 111 and determine whether the first battery 151 is available based on the comparison result.

For example, the power management controller 140 may determine that the battery 151 is not available based on the charged amount of the first battery 151 smaller than a threshold determined based on the power demand amount of the first controller 111 and determine that the first battery 151 is available based on the charged amount of the first battery 151 greater than or equal to the threshold determined based on the power demand amount of the first controller 111.

The threshold determined based on the power demand amount of the first controller 111 may be determined based on the power demand amount of the first controller 111 and a management lower limit value of the first battery 151. Information on the lower management limit value of the first battery 151 may be previously stored in the memory of the power management controller 140.

For example, the power management controller 140 may determine the threshold as the value obtained by multiplying a preset margin factor with a value obtained by summing the power demand amount of the first controller 111 and the management lower limit value of the first battery 151.

In summary, the power management controller 140 may determine that the first battery 151 is available when an expected charged amount of the first battery 151 is, after the first battery 151 provides the power to the first controller 111, predicted to be greater than the management lower limit value and determine that the first battery 151 is not available when the expected charged amount of the first battery 151 is, after the first battery 151 provides the power to the first controller 111, predicted to be smaller than the management lower limit value.

The power management controller 140 may transmit the power use permission message to the first controller 111 based on the determination that the first battery 151 is available (Yes in S5) (S6).

Conversely, the power management controller 140 may transmit the power use prohibition message to the first controller 111 based on the determination that the first battery 151 is not available (No in S5) (S7).

The first controller 111 may operate the first load 110 after receiving power from the first battery 151 based on receiving the power use permission message from the power management controller 140.

For example, when the first controller 111 receives the power use permission message from the power management controller 140, the first controller 111 may supply the power of the first battery 151 to the first load 110 by closing a switch connecting the first battery 151 to the first load 110.

Conversely, the first controller 111 may maintain the first load 110 in a state of not being operated based on receiving the power use prohibition message from the power management controller 140.

For example, when the first controller 111 receives the power use prohibition message from the power management controller 140, the first controller 111 may maintain the first load 110 in the state of not being operated by maintaining the switch for connecting the first battery 151 to the first load 110 to be opened or in an open state.

When the first controller 111 operates the first load 110 after receiving the power use permission message from the power management controller 140, the first controller 111 may transmit a power use completion message to the power management controller 140 based on completing the operation of the first load 110 (Yes in S8) (S9).

As an example, assuming that the first load 110 is the after blower, the first controller 111 may transmit the power use completion message to the power management controller 140 based on ending the operation of the after blower.

As another example, assuming that the first load 110 is the navigation device, the first controller 111 may transmit the power use completion message to the power management controller 140 based on ending a software update.

The power management controller 140 may confirm that the power use of the first controller 111 has been completed in response to receiving the power use completion message from the first controller 111.

Meanwhile, like the first controller 111, the second controller 121 may also transmit the power request message to the power management controller 140 based on satisfying the operating condition of the second load 120 (S10).

The power management controller 140 may identify at least one battery (hereinafter referred to as the "second battery") configured to supply power to the second controller 121 upon receiving the power request message from the second controller 121 (S11).

Thereafter, according to the above-described process, the power management controller 140 may request the information on the charged amount of the second battery from the battery sensor 160 or the battery management controller 170 (S12), and the battery sensor 160 or the battery management controller 170 may transmit the information on the charged amount of the second battery to the power management controller 140 in response to receiving the request for the information on the charged amount of the second battery from the power management controller 140 (S13).

When the vehicle 1 does not include the auxiliary battery 152, the second battery configured to supply the power to the second controller 121 may be the same as the first battery configured to supply the power to the first controller 111.

The power management controller 140 may determine whether the second battery 151 is available based on the information on the charged amount of the second battery 151 and the power demand amount of the second controller 121 (S14).

According to various embodiments, the power management controller 140 may determine whether the second battery 151 is available based on the information on the charged amount of the second battery 151 and the power demand amount of the second controller 121 after receiving the power use completion message from the first controller 111.

However, the power management controller 140 may determine whether the second battery 151 is available based on the information on the charged amount of the second battery 151, the power demand amount of the second controller 121, and the expected power consumption of the first controller 111 before receiving the power use completion message from the first controller 111.

In other words, when the first controller 111 is already operating the first load 110, the power management controller 140 may identify a value obtained by subtracting the expected power consumption required to complete the operation of the first load 110 from a current charged amount of the second battery 151 as an actual charged amount of the second battery 151.

The power management controller 140 may transmit the power use permission message to the second controller 121 based on the determination that the second battery 151 is available (Yes in S14) (S15).

Conversely, the power management controller 140 may transmit the power use prohibition message to the second controller 121 based on the determination that the second battery 151 is not available (No in S14) (S16).

According to various embodiments, the second controller 121 may operate the second load 120 after receiving power from the second battery 151 based on receiving the power use permission message from the power management controller 140.

For example, when the second controller 121 receives the power use permission message from the power management controller 140, the second controller 121 may supply the power of the second battery 151 to the second load 120 by closing a switch connecting the second battery 151 to the second load 120.

Conversely, the second controller 121 may maintain the second load 120 in a state of not being operated based on receiving the power use prohibition message from the power management controller 140.

For example, when the second controller 121 receives the power use prohibition message from the power management controller 140, the second controller 121 may maintain the second load 120 in the state of not being operated by maintaining the switch, which connects the second battery 151 to the second load 120 in an open state.

According to the present disclosure, the plurality of controllers 111, 121, and 131 may simply transmit the power request message to the power management controller 140 to receive the power while the vehicle 1 is parked. Therefore, it is possible to simplify an algorithm stored in the memories of the plurality of controllers 111, 121, and 131.

In addition, according to the present disclosure, the power management controller 140 determines whether the battery unit 150 is used after checking the operating situations of the plurality of controllers 111, 121, and 131. Therefore, it is possible to prevent the battery from being fully discharged when the plurality of controllers 111, 121, and 131 simultaneously request the power from the same battery 151.

Figure 6:
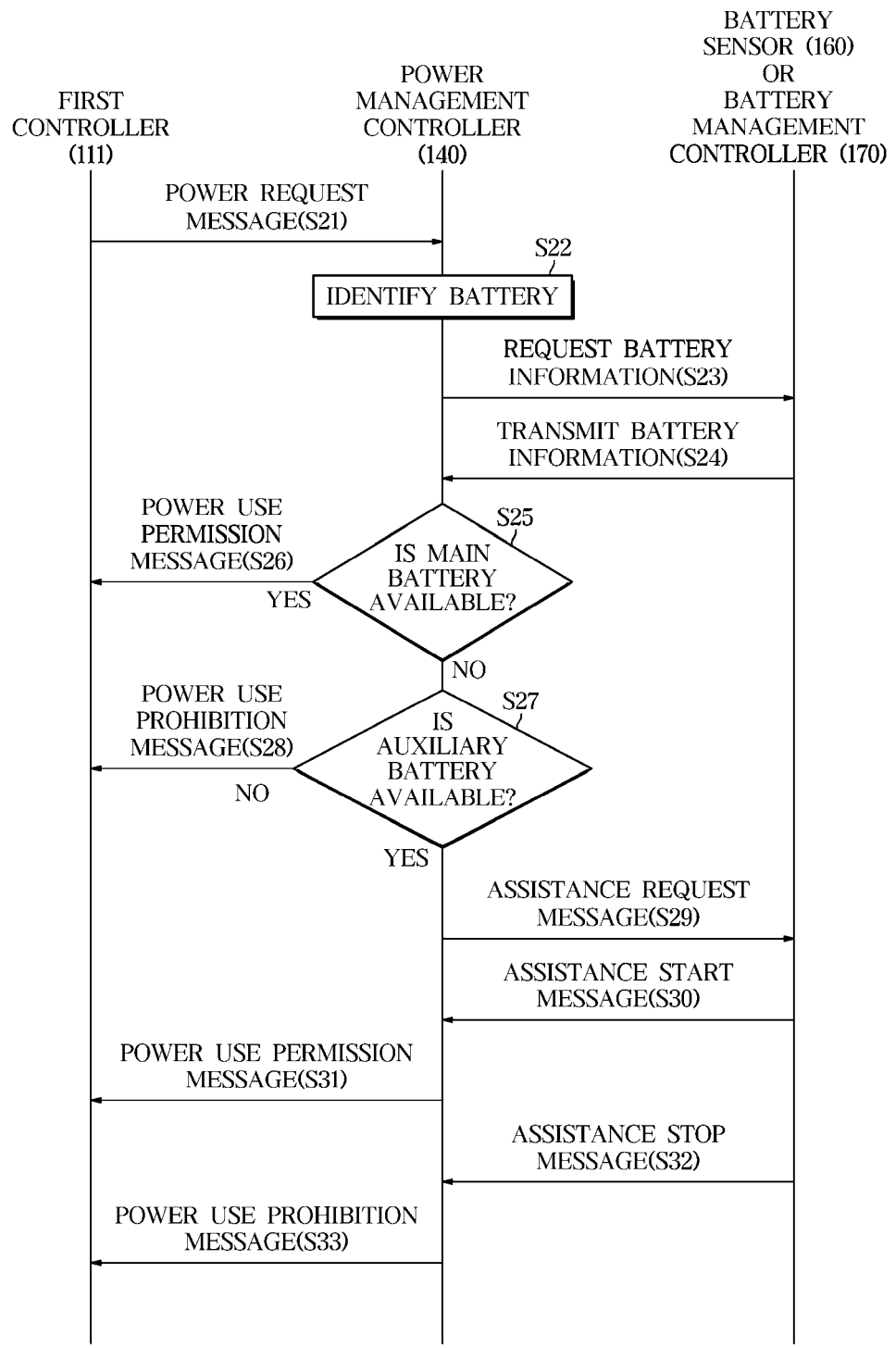
FIG. 6 is a flowchart showing an example of a method of controlling a vehicle when the vehicle includes a main battery and an auxiliary battery according to one embodiment.

FIG. 6 is a flowchart showing an example of a method of controlling a vehicle when the vehicle includes a main battery and an auxiliary battery according to one embodiment.

FIG. 6 shows an example in which the first controller 111 transmits the power request message to the power management controller 140, but it goes without saying that the description of the first controller 111 may be applied to the second controller 121 and the $n^{th}$ controller 131 in the same manner.

Referring to FIG. 6, the first controller 111 may transmit the power request message to the power management controller 140 based on satisfying the operating condition of the first load 110 (S21), and the power management controller 140 may identify at least one first battery configured to supply the power to the first controller 111 upon receiving the power request message from the first controller 111 (S22).

According to various embodiments, when the battery unit 150 of the vehicle 1 includes the main battery 151 and the auxiliary battery 152, the at least one first battery may include the main battery 151 and the auxiliary battery 152.

For example, when the vehicle 1 corresponds to the internal combustion engine vehicle 10 and the auxiliary battery 152 (e.g., the dual power source battery) is applied to the vehicle 1, the plurality of batteries 18 in FIG. 1 may be identified as the first battery.

In addition, when the vehicle 1 corresponds to the electric vehicle 20 and the auxiliary battery 152 is applied to the vehicle 1, the power management controller 140 may identify the plurality of low-voltage batteries 29 in FIG. 2 as the first battery.

In addition, when the vehicle 1 corresponds to the electric vehicle 20 and the high-voltage battery 28 is available as the auxiliary battery 152 in the vehicle 1, the power management controller 140 may identify the low-voltage battery 29 and the high-voltage battery 28 in FIG. 2 as the first battery.

In addition, when the vehicle 1 corresponds to the HEV 30 and the auxiliary battery 152 is applied to the vehicle 1, the power management controller 140 may identify the plurality of low-voltage batteries 39 in FIG. 3 as the first battery.

In addition, when the vehicle 1 corresponds to the HEV 30 and the high-voltage battery 38 is available as the auxiliary battery 152 in the vehicle 1, the power management controller 140 may identify the low-voltage battery 39 and the high-voltage battery 38 in FIG. 3 as the first battery.

The power management controller 140 may request the information on the charged amount of the first battery from the battery sensor 160 or the battery management controller 170 (S23).

According to various embodiments, when the vehicle 1 corresponds to the internal combustion engine vehicle 10 and the auxiliary battery 152 (e.g., the dual power source battery) is applied to the vehicle 1, the power management controller 140 may request the information on the charged amount of the battery 18 from the battery sensor 160 configured to detect the charged amount of the battery 18 in FIG. 1 through the vehicle communication network NT.

According to various embodiments, when the vehicle 1 corresponds to the electric vehicle 20 and the auxiliary battery 152 is applied to the vehicle 1, the power management controller 140 may request information on charged amounts of the batteries 28 and 29 in FIG. 2 from the battery management controller 170 configured to manage the batteries 28 and 29 through the vehicle communication network NT.

According to various embodiments, when the vehicle 1 corresponds to the HEV 30 and the auxiliary battery 152 is applied to the vehicle 1, the power management controller 140 may request information on charged amounts of the batteries 38 and 39 in FIG. 3 from the battery management controller 170 configured to manage the batteries 38 and 39 through the vehicle communication network NT.

The battery sensor 160 or the battery management controller 170 may transmit the information on the charged amounts of the first batteries 151 and 152 (18, 28, 29, 38, or 39) to the power management controller 140 in response to receiving the request for the information on the charged amounts of the first batteries 151 and 152 from the power management controller 140 (S24).

According to various embodiments, when the high-voltage batteries 28 and 38 are operated as the main battery 151, the power management controller 140 may request step-down of the voltages of the high-voltage batteries 28 and 38 from the battery management controller 170, and the battery management controller 170 may transmit a message permitting or rejecting the step-down of the powers of the high-voltage batteries 28 and 38 to the power management controller 140.

The power management controller 140 may determine that the main battery 151 is available upon receiving the message permitting the step-down of the powers of the high-voltage batteries 28 and 38 and determine that the main battery 151 is not available upon receiving a reject message for the step-down of the powers of the high-voltage batteries 28 and 38. The power management controller 140 may determine whether the first batteries 151 and 152 are available based on the information on the charged amounts of the first batteries 151 and 152 and the power demand amount of the first controller 111 (S25 and S27).

According to various embodiments, the power management controller 140 may compare the charged amount of the main battery 151 with the power demand amount of the first controller 111 and determine whether the main battery 151 is available based on the comparison result. A method of determining whether the main battery 151 is available is the same as described above.

The power management controller 140 may transmit a power availability message to the first controller 111 based on the determination that the main battery 151 is available (Yes in S25) (S26).

For example, the power management controller 140 may transmit the power availability message to one controller 111 upon receiving the message permitting the step-down of the powers of the high-voltage batteries 28 and 38 from the battery management controller 170.

Conversely, when it is determined that the main battery 151 is not available (No in S25), the power management controller 140 may determine whether power may be supplied to the first controller 111 through the power assistance of the auxiliary battery 152 (S27).

For example, the power management controller 140 may determine whether the power may be supplied to the first controller 111 through the power assistance of the low-voltage batteries 29 and 39 upon receiving a reject message for the step-down of the powers of the high-voltage batteries 28 and 38 from the battery management controller 170.

According to various embodiments, the power management controller 140 may compare the charged amount of the main battery 151 and the charged amount of the auxiliary battery 152 with the power demand amount of the first controller 111 and determine whether the first batteries 151 and 152 are available based on the comparison result.

For example, the power management controller 140 may determine that the first batteries 151 and 152 are not available based on a value obtained by summing the charged amount of the main battery 151 and the charged amount of the auxiliary battery 152 smaller than the threshold determined based on the power demand amount of the first controller 111, and determine that the first batteries 151 and 152 are available based on the value obtained by summing the charged amount of the main battery 151 and the charged amount of the auxiliary battery 152 greater than or equal to the threshold determined based on the power demand amount of the first controller 111.

The threshold determined based on the power demand amount of the first controller 111 may be determined based on the power demand amount of the first controller 111 and the management lower limit value of the main battery 151. The information on the management lower limit value of the main battery 151 may be previously stored in the memory of the power management controller 140.

For example, the power management controller 140 may determine the threshold to be the value obtained by multiplying the preset margin factor with a value obtained by summing the power demand amount of the first controller 111 and the management lower limit value of the main battery 151.

In summary, the power management controller 140 may determine that the first batteries 151 and 152 are available when the expected charged amount of the main battery 151 is, after the main battery 151 and the auxiliary battery 152 provide the power to the first controller 111, predicted to be greater than the management lower limit value and determine that the first batteries 151 and 152 are not available when the expected charged amount of the main battery 151 is, after the main battery 151 and the auxiliary battery 152 provide the power to the first controller 111, predicted to be smaller than the management lower limit value.

When it is determined that the first batteries 151 and 152 are not available even when the power assistance of the auxiliary battery 152 is available (No in S27), the power management controller 140 may transmit the power use prohibition message to the first controller 111 (S28).

According to various embodiments, when power may be supplied to the first controller 111 through the power assistance of the auxiliary battery 152 (Yes in S27), the power management controller 140 may transmit an assistance request message to the auxiliary battery 152 (S29).

When the vehicle 1 corresponds to the internal combustion engine vehicle 10, the power management controller 140 may directly transmit the assistance request message to the auxiliary battery 152 through the vehicle communication network NT and when the vehicle 1 corresponds to the electric vehicle 20 or the HEV 30, the power management controller 140 may transmit the assistance request message to the battery management controller 170 through the vehicle communication network NT.

The auxiliary battery 152 and/or the battery management controller 170 may perform a power assistance operation of the auxiliary battery 152 upon receiving the assistance request message from the power management controller 140. When the auxiliary battery 152 performs the power assistance operation, the auxiliary battery 152 may supply the power to the first controller 111.

The auxiliary battery 152 and/or the battery management controller 170 may transmit an assistance start message to the power management controller 140 upon performing the power assistance operation of the auxiliary battery 152 (S30).

The power management controller 140 may confirm that the first controller 111 is receiving the power from the auxiliary battery 152 upon receiving the assistance start message from the auxiliary battery 152 or the battery management controller 170 and transmit the power availability message to the first controller 111 (S31).

Meanwhile, the auxiliary battery 152 or the battery management controller 170 may stop the power assistance operation of the auxiliary battery 152 based on satisfying a preset stop condition.

The preset stop condition may include at least one condition in which the power assistance of the auxiliary battery 152 is not available.

The auxiliary battery 152 or the battery management controller 170 may transmit the assistance stop message to the power management controller 140 based on stopping the power assistance operation of the auxiliary battery 152 (S32).

The power management controller 140 may transmit the power use prohibition message to the first controller 111 when the power assistance operation of the auxiliary battery 152 is ended even when the operation of the first load 110 is not completed (S33).

In other words, after transmitting the power use permission message to the first controller 111 and before the power management controller 140 receives the power use completion message from the first controller 111, the power management controller 140 may transmit the power use prohibition message to the first controller 111 based on stopping the power assistance operation of the auxiliary battery 152.

The first controller 111 receiving the power use prohibition message may stop the operation of the first load 110.

According to the present disclosure, when the auxiliary battery 152 is applied to the vehicle 1, it is possible to efficiently supply the power to the plurality of loads using both the main battery 151 and the auxiliary battery 152.

In addition, according to the present disclosure, when the power assistance operation of the auxiliary battery 152 is stopped, the operation of the load in operation can be stopped to prevent the main battery 151 from being fully discharged.

Figure 7:
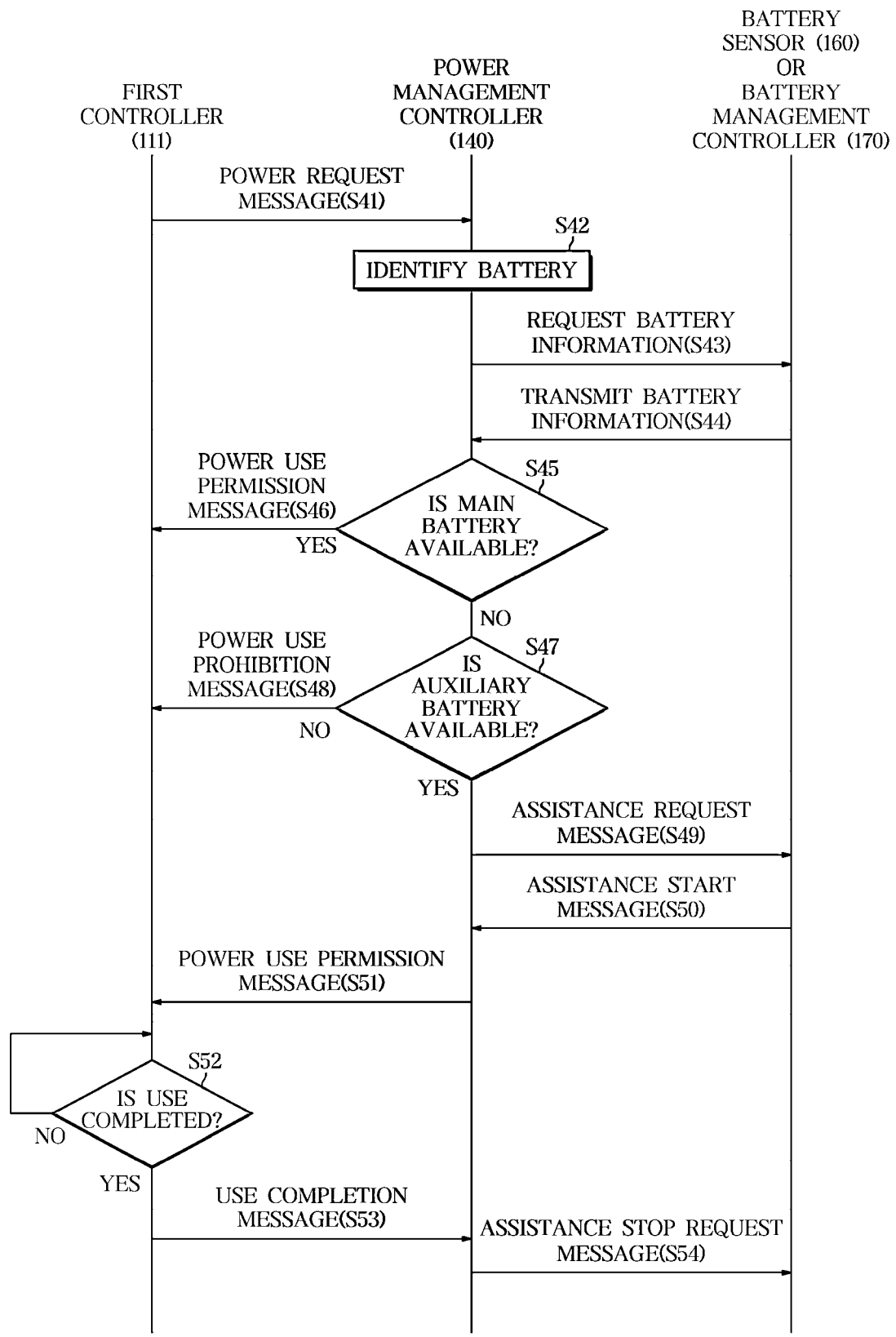
FIG. 7 is a flowchart showing another example of a method of controlling a vehicle when the vehicle includes a main battery and an auxiliary battery according to one embodiment.

FIG. 7 is a flowchart showing another example of a method of controlling a vehicle when the vehicle includes a main battery and an auxiliary battery according to one embodiment.

Referring to FIG. 7, the first controller 111, the power management controller 140 and the battery sensor 160 or the battery management controller 170 may perform a series of operations (S41, S42, S43, S44, S45, S46, S47, S48, S49, S50, and S51) shown in FIG. 7.

The first controller 111 may operate the first load 110 after receiving power of the main battery 151 and the auxiliary battery 152 upon receiving the power availability message (S51) from the power management controller 140.

The first controller 111 may transmit the power use completion message to the power management controller 140 based on completing the operation of the first load 110 (Yes in S52) (S53).

When the auxiliary battery 152 performs the power assistance operation even when the power use of the first controller 111 is completed, there is a risk of the auxiliary battery 152 being fully discharged.

Therefore, the power management controller 140 may transmit an assistance stop request message to the auxiliary battery 152 or the battery management controller 170 upon receiving the power use completion message (S53) from the first controller 111 (S54).

The auxiliary battery 152 or the battery management controller 170 receiving the assistance stop request message may stop the power assistance operation of the auxiliary battery 152.

According to the present disclosure, it is possible to prevent the auxiliary battery 152 from being fully discharged by stopping the power assistance operation of the auxiliary battery 152 in a situation in which it is not necessary to use the auxiliary battery 152.

According to the present disclosure, the power management controller 140 can efficiently manage the power of the vehicle 1 parked regardless of the type of the vehicle 1 classified according to the energy source and/or the type of the battery applied to the vehicle 1.

Meanwhile, those skilled in the art will be able to easily confirm that the power management controller 140 is a component which may be distinguished from the battery management controller 170 of the electric vehicle 20 and/or the HEV 30 and may also be applied to the internal combustion engine vehicle 10.

Some components of the vehicle 1 may be software and/or hardware components such as a FPGA and an ASIC.

Meanwhile, the disclosed embodiments may be implemented in the form of a recording medium for storing instructions executable by a computer. The instructions may be stored in the form of program code, and may generate program modules to perform the operations of the disclosed embodiments when executed by a processor. The recording medium may be implemented as a computer-readable recording medium.

Computer-readable recording media include all types of recording media in which the instructions readable by the computer are stored. For example, the recording media may include read only memories (ROMs), random access memories (RAMs), magnetic tapes, magnetic discs, flash memories, optical data storage devices, and the like.

According to the present disclosure, it is possible to efficiently operate a plurality of loads while a vehicle is parked regardless of the type of the vehicle.

In addition, according to the present disclosure, it is possible to alleviate the data processing burden of a plurality of controllers configured to control a plurality of loads.

In addition, according to the present disclosure, it is possible to efficiently determine the amount of available power of a battery.

The disclosed embodiments have been described above with reference to the accompanying drawings. Those skilled in the art to which the present disclosure pertains will understand that the present disclosure may be carried out in other forms than the disclosed embodiments without changing the technical spirit or essential features of the present disclosure. The disclosed embodiments are illustrative and should not be construed as being restrictive.

What is claimed is:

1. A vehicle comprising:
   a first controller configured to control an operation of a first load, the first load being configured to operate while the vehicle is parked; and
   a power management controller configured to identify:
      at least one first battery configured to supply power to the first controller based on information on the vehicle in response to receiving a power request message from the first controller, and
      transmit a power use prohibition message or a power use permission message to the first controller based on a charged amount of the at least one first battery and a power demand amount of the first controller.

2. The vehicle of claim 1, further comprising a second controller configured to control an operation of a second load, the second load being configured to operate while the vehicle is parked,
   wherein the power management controller is further configured to:
      identify at least one second battery configured to supply power to the second controller based on the information on the vehicle in response to receiving the power request message from the second controller, and
      transmit the power use prohibition message or the power use permission message to the second controller based on a charged amount of the at least one second battery and a power demand amount of the second controller.

3. The vehicle of claim 1, wherein the first controller is further configured to:
   operate the first load in response to receiving the power use permission message from the power management controller, and
   maintain the first load in a state of not being operated in response to receiving the power use prohibition message from the power management controller.

4. The vehicle of claim 1, wherein the information on the vehicle includes at least one of a type of the vehicle classified based on an energy source and a type of at least one battery applied to the vehicle.

5. The vehicle of claim 4, wherein the vehicle is an internal combustion engine vehicle, the power management controller is further configured to acquire information on the charged amount of the at least one first battery from at least one battery sensor, and the at least one battery sensor is configured to detect the charged amount of the at least one first battery.

6. The vehicle of claim 4, wherein the vehicle is an electric vehicle, and the power management controller is further configured to request information on the charged amount of the at least one first battery from a battery management controller.

7. The vehicle of claim 1, wherein the at least one first battery includes a main battery, and
   the power management controller is configured to:
      transmit the power use prohibition message to the first controller based on a charged amount of the main battery being smaller than a threshold determined based on the power demand amount of the first controller, and
      transmit the power use permission message to the first controller based on the charged amount of the main battery being greater than or equal to the threshold.

8. The vehicle of claim 1, wherein the at least one first battery includes a main battery and an auxiliary battery, and
   the power management controller is configured to:
      transmit the power use prohibition message to the first controller based on a value obtained by summing a charged amount of the main battery and a charged amount of the auxiliary battery being smaller than a threshold determined based on the power demand amount of the first controller, and
      transmit the power use permission message to the first controller based on the value obtained by summing the charged amount of the main battery and the charged amount of the auxiliary battery being greater than or equal to the threshold.

9. The vehicle of claim 8, wherein the power management controller is further configured to transmit the power use prohibition message to the first controller in response to stopping a power assistance operation of the auxiliary battery after the power use permission message is transmitted to the first controller.

10. The vehicle of claim 1, wherein the at least one first battery includes a high-voltage battery and a low-voltage battery, and
    the power management controller is further configured to:
       request step-down of a voltage of the high-voltage battery from a battery management controller,
       request information on a charged amount of the low-voltage battery from the battery management controller, and
       transmit the power use prohibition message or the power use permission message to the first controller based on the information on the charged amount of the low-voltage battery in response to receiving a reject message for the step-down of the voltage of the high-voltage battery from the battery management controller.

11. A method of controlling a vehicle, comprising:
    transmitting, by a first controller configured to control an operation of a first load, a power request message to a power management controller, wherein the first load is configured to operate while the vehicle is parked;

identifying, by the power management controller, at least one first battery configured to supply power to the first controller based on information on the vehicle in response to receiving the power request message from the first controller; and transmitting, by the power management controller, a power use prohibition message or a power use permission message to the first controller based on a charged amount of the at least one first battery and a power demand amount of the first controller.

12. The method of claim 11, further comprising:

transmitting, by a second controller configured to control an operation of a second load, the power request message to the power management controller, wherein the second load is configured to operate while the vehicle is parked;

identifying, by the power management controller, at least one second battery configured to supply power to the second controller based on the information on the vehicle in response to receiving the power request message from the second controller; and transmitting, by the power management controller, the power use prohibition message or the power use permission message to the second controller based on a charged amount of the at least one second battery and a power demand amount of the second controller.

13. The method of claim 11, further comprising:

operating, by the first controller, the first load in response to receiving the power use permission message from the power management controller; and maintaining, by the first controller, the first load in a state of not being operated in response to receiving the power use prohibition message from the power management controller.

14. The method of claim 11, wherein the information on the vehicle includes at least one of a type of the vehicle classified based on an energy source and a type of at least one battery applied to the vehicle.

15. The method of claim 14, wherein the vehicle is an internal combustion engine vehicle, and the method further comprises acquiring, by the power management controller, information on the charged amount of the at least one first battery from at least one battery sensor, wherein the at least one battery sensor is configured to detect the charged amount of the at least one first battery.

16. The method of claim 14, wherein the vehicle is an electric vehicle, the method further comprises requesting, by the power management controller, information on the charged amount of the at least one first battery from a battery management controller.

17. The method of claim 11, wherein the at least one first battery includes a main battery, and the transmitting of, by the power management controller, the power use prohibition message or the power use permission message to the first controller includes:

transmitting the power use prohibition message to the first controller based on a charged amount of the main battery being smaller than a threshold determined based on a power demand amount of the first controller; and transmitting the power use permission message to the first controller based on the charged amount of the main battery being greater than or equal to the threshold.

18. The method of claim 11, wherein the at least one first battery includes a main battery and an auxiliary battery, and the transmitting of, by the power management controller, the power use prohibition message or the power use permission message to the first controller includes:

transmitting the power use prohibition message to the first controller based on a value obtained by summing a charged amount of the main battery and a charged amount of the auxiliary battery being smaller than a threshold determined based on the power demand amount of the first controller; and transmitting the power use permission message based on the value obtained by summing the charged amount of the main battery and the charged amount of the auxiliary battery being greater than or equal to the threshold.

19. The method of claim 18, further comprising transmitting, by the power management controller, the power use prohibition message to the first controller in response to stopping a power assistance operation of the auxiliary battery after the power use permission message is transmitted to the first controller.

20. The method of claim 11, wherein the at least one first battery includes a high-voltage battery and a low-voltage battery, and the transmitting of the power use prohibition message or the power use permission message to the first controller includes:

requesting step-down of a voltage of the high-voltage battery from a battery management controller;

requesting information on a charged amount of the low-voltage battery from the battery management controller; and transmitting the power use prohibition message or the power use permission message to the first controller based on the information on the charged amount of the low-voltage battery in response to receiving a reject message for the step-down of the voltage of the high-voltage battery from the battery management controller.

* * * * *